United States Patent
Cipriani

[11] Patent Number: 5,941,653
[45] Date of Patent: Aug. 24, 1999

[54] COMPOSITE STRUCTURE AND METHOD FOR ITS ASSEMBLY

[75] Inventor: Alfredo Cipriani, Guidonia, Italy

[73] Assignee: Alstom Transport Electrification S.p.A., Rome, Italy

[21] Appl. No.: 08/856,682

[22] Filed: May 15, 1997

[30] Foreign Application Priority Data

May 30, 1996 [IT] Italy .................................. SV96A0017

[51] Int. Cl.[6] .................................................. B25G 3/00
[52] U.S. Cl. .......................... 403/344; 403/373; 403/338; 403/DIG. 9
[58] Field of Search .................................... 403/373, 344, 403/DIG. 9, 338, 337, 384, 385; 104/123, 124, 125

[56] References Cited

U.S. PATENT DOCUMENTS

| | | | |
|---|---|---|---|
| 698,098 | 4/1902 | Barnes et al. | 403/373 |
| 1,706,801 | 3/1929 | Merrill | 403/385 |
| 2,326,941 | 8/1943 | Heitner | 403/373 X |
| 2,390,192 | 12/1945 | St. Clair | 403/373 X |
| 3,606,409 | 9/1971 | Hawkins, Jr. | 403/373 X |
| 4,068,965 | 1/1978 | Lichti | 403/344 X |
| 4,111,575 | 9/1978 | Hoshino | 403/373 X |
| 4,187,934 | 2/1980 | Senften . | |
| 4,708,512 | 11/1987 | Allert | 403/344 |
| 4,723,374 | 2/1988 | Peterson et al. . | |

FOREIGN PATENT DOCUMENTS

| | | |
|---|---|---|
| 0406840 | 1/1991 | European Pat. Off. . |
| 2631417 | 11/1989 | France . |
| 676588 | 6/1939 | Germany . |
| 222662 | 10/1924 | United Kingdom ............ 403/344 |
| 841090 | 7/1960 | United Kingdom . |
| 1313609 | 4/1973 | United Kingdom . |
| 9108923 | 6/1991 | WIPO . |

OTHER PUBLICATIONS

Bauer, et al., "The Use of Aluminum for the Overhead Catenary System on German Federal Railway's New High–Speed Lines", Elektrishce Bahnen, vol. 84, Oct. 1986, pp. 298–306.

Primary Examiner—Brian K. Green
Assistant Examiner—William L. Miller
Attorney, Agent, or Firm—James Creighton Wray; Meera P. Narasimhan

[57] ABSTRACT

A composite structure has a rod (1) and a collar (2) locked on the rod (1) and composed of two semicollars (12, 22), each extending over an angle smaller than 180° and having lateral longitudinal flanges (12', 12", and 22', 22"), whereat they are linked to each other by clamping bolts (3', 3"). The flanges (12', 22') on one side of the semicollars (12, 22) adhere to each other with their facing plane surfaces (212', 222'), whereas the facing plane surfaces (212", 222") of the flanges (12", 22") on the opposite side of the semicollar (12, 22) are spaced. The rod (1) has at least one outer positioning projection (6', 6"), which is engaged in a corresponding inner positioning recess of the collar (2).

15 Claims, 4 Drawing Sheets

COMPOSITE STRUCTURE AND METHOD FOR ITS ASSEMBLY

BACKGROUND OF THE INVENTION

1. Field of the Invention

The invention relates to a composite structure, comprising a rod whose outer profile is circular or anyhow curvilinear and preferably tubular, and a collar locked on the rod and composed of two semicollars, which have lateral longitudinal flanges projecting outwards, and are clamped to each other and locked on the rod by means of bolts or other clamping systems, passed through the flanges associated to each other, each flange of each semicollar being delimited by two surfaces which are substantially plane-parallel, one, the so-called inner one, which faces the associated flange of the other semicollar, and the other opposite, the so-called outer one, whereas the substantially semicylindrical inner surface of at least one of the semicollars extends—in cross section—over a circular arc of less than 180° between the inner surfaces of the two flanges of the corresponding semicollar. Another object of the invention is a method for assembly of this composite structure, that is a method for mounting the collar on its respective rod, as well as a preferred use of the composite structure itself.

2. Prior Art

In prior art composite structures of this type, the flanges of each semicollar are not directly touching those of the other collar and, on mounting, the prescribed distances between the inner surfaces of the two pairs of flanges must be respected. Namely, this type of collar must be mounted in such a way that, in the mounted condition of the collar, the facing inner surfaces of the flanges of the two semicollars, tightened by means of clamping bolts, must be substantially parallel to each other and properly spaced. Only in this case, the axes of the clamping bolts are disposed so as to be substantially perpendicular to their respective flanges, fixed to each other, of the semicollars, whereas the heads and the nuts—or the corresponding washers—adhere substantially with the whole of their bearing surface to the corresponding outer plane surfaces of the flanges. However, this position of the two semicollars while tighthened and locked on its respective rod is very difficult to achieve in practice or requires a long and tiring mounting work, consisting, for example in the tightening of the clamping bolts on the two sides of the collar alternately each time of a small step, trying to keep the flanges of the two semicollars parallel and properly spaced. Frequently, on mounting of the collar on the rod, the flanges of the semicollars on one side of the collar are tightened and approached to each other to a larger extent than the flanges of the collars on the opposite side. Consequently, the substantially complanar flanges of one of the semicollars and the substantially complanar flanges of the other semicollar are slanted towards each other on both sides of the collar and the axes of the clamping bolts are no longer perpendicular to at least one of their two respective linked flanges, and so the head and/or the nut (or their respective washers) of the clamping bolts adhere to the corresponding outer surfaces of their respective flanges no longer with the whole of their bearing surface but only locally, with a portion of it. This generates high local specific pressures, and the danger of deformations and/or of an incomplete and/or not uniform and/or asymmetric adhesion of the inner surface of the collar against the corresponding outer surface of the rod, which can finally compromise the firm and safe locking of the collar on the rod.

The invention is aimed at eliminating the aforesaid drawbacks and at providing a composite structure of the type described hereinbefore, in which the collar may be mounted on the rod in an easier and faster way; ensuring in an easy and substantially automatic manner the axes of the clamping bolts to be always substantially perpendicular to their respective flanges of the semicollars on both sides of the latter, and thus the said bolts to adhere substantially with the whole of the bearing surface of their heads and of their nuts (or of their respective washers) against the outer surfaces of the corresponding pairs of flanges linked to each other.

SUMMARY OF THE INVENTION

This problem is worked out by the invention thanks to the fact that, in the working condition, the collar has a first pair of flanges with touching inner surfaces, while the second pair of flanges has the inner (parallel) surfaces at a certain predetermined distance from each other, so that, when the collar is mounted and locked on the rod, the first flanges of the two semicollars on one side of the collar adhere to each other with their inner surfaces, whereas the opposite flanges of the two semicollars on the other side of the collar are spaced. The inner surfaces of the pair of spaced flanges may be parallel, divergent or anyhow reciprocally orientated, while the outer ones are anyway always substantially parallel in the working condition. The inner surfaces of the first pair of flanges, which are touching in the working condition, may be substantially parallel to the outer surfaces of the flanges themselves, or may be slanted as to be conjugate to each other, for example in the case of substantially wedge-shaped flanges.

For the assembly of this composite structure, that is for the mounting and the locking of the collar on its respective rod, the invention provides a method comprising the following steps:

a) the two semicollars are mounted around the rod, through adhesion and matching of the inner surfaces of the first flanges of the two semicollars themselves and through tightening, preferably to a definitive extent, these two flanges by means of their respective clamping bolt or bolts, b) further, the opposite flanges of the two semicollars are tightened, by means of their respective clamping bolt/bolts or device/devices until reaching the prescribed tightening torque or the parallelism or the perdetermined relative position of the facing and spaced inner surfaces, of the said opposite flanges.

From the above disclosure, it is evident that, thanks to the particular asymmetric construction of each semicollar of the collar of the composite structure according to the invention, and thanks to the particular method for assemblying such a structure, enabled by the said construction of the semicollars, the collar may be locked in the selected position on its respective rod through an easier and faster mounting work, because—for the locking of the collar on the rod—it is only necessary to tighten the two first mutually adhering flanges of the semicollars on one side of the latter, and then tighten the opposite spaced flanges of the semicollars on the other side of the latter, up to the predetermined tightening value, or until the said opposite flanges reach a position, in which their inner facing and spaced surfaces appear substantially parallel or anyway in a predetermined position with respect to each other. In the collar so mounted and locked, all the clamping bolts are orientated with their axes automatically in a direction substantially perpendicular to their respective pairs of flanges and thus adhere substantially with all the bearing surface of their heads and of their nuts, or of their respective washers, against the corresponding plane-parallel outer surfaces of the flanges, eliminating the drawbacks and the dangers which may derive from mutually slanted positions of the flanges and of the clamping bolts with respect to the flanges.

The composite structure according to the invention may be advantageously used in many different fields of technology and particularly in supporting frameworks of overhead lines for railway installations or similar. The collar fixed on the rod may be made, as for its further characteristics, in many different ways, according to its function and intended purpose. Particularly, and for example in the above mentioned supporting frameworks of overhead lines, the collar may be used as an element for connection to other parts of a comprehensive composite structure. In this case, and in other similar cases, at least one of the semicollars may have any suitable connecting means, like, for example, at least one outer eye connecting member.

Particularly, when at least one of the semicollars is provided with one or more outer connecting members, it is often necessary to lock the collar on its respective rod in a specific angular position. For this purpose, according to a further characteristic of the invention, the rod on which the collar is to be mounted and locked, has on its outer surface at least one small positioning projection, fit for engagement with a corresponding inner positioning recess of at least one of the semicollars, or vice versa, thus defining the desired angular position of the collar on the rod itself. The outer positioning projection or the outer positioning recess of the rod may be formed by a longitudinal rib or by a longitudinal groove, which may extend on a limited portion of the rod length or on the whole of the rod length itself. The corresponding inner positioning recess or the corresponding inner positioning projection of the collar may then be formed by a longitudinal groove or by a longitudinal rib, extending on the whole of the length of the collar itself. The inner positioning recess or the inner positioning projection of the collar may be provided as coinciding with the inner surface of at least one of the semicollars. Preferably, however, according to an advantageous embodiment of the invention, the inner positioning recess or the inner positioning projection of the collar are provided as coinciding with the adhesion and matching plane of the aforesaid first flanges of the two semicollars, each half in each of the said two semicollars, through profiling in a corresponding manner the angles between the inner surface of the two semicollars and the respective inner surfaces of their first flanges, which are meant to adhere to each other when the collar is mounted on the rod.

These expedients allow for a relatively loose mounting of the collar on the rod, enabling it to be carried, through a simple axial slide along the rod, into the predetermined position thereon, still keeping the same angular orientation of the collar around the rod.

The advantages of this possibility are particularly incisive, when the collars are used as connecting elements for more longitudinal elements, rods, tie rods, or similar, for the construction of structures with predetermined geometries, and particularly when working in unstable or uncomfortable positions.

The invention regards also a modified embodiment of the collar of the composite structure, which embodiment differs from the preceding example in the fact that the two semicollars are hinged one to the other at the first flanges showing the touching inner surfaces.

The semicollars are engageable and disengageable one to and from the other, particularly with a displacement of insert and of extraction in a direction parallel to the axis of the collar.

The first flanges show the shape of complementary parts of a hinge. The axis of the hinge is located radially outwards with respect to the inner touching surfaces.

The characteristics of the invention and the advantages derived therefrom will appear in greater detail from the following description of some preferred embodiments, illustrated by way of example and not restriction in the annexed drawings in which:

DETAILED DESCRIPTION OF THE PREFERRED EMBODIMENT

Figure 1:
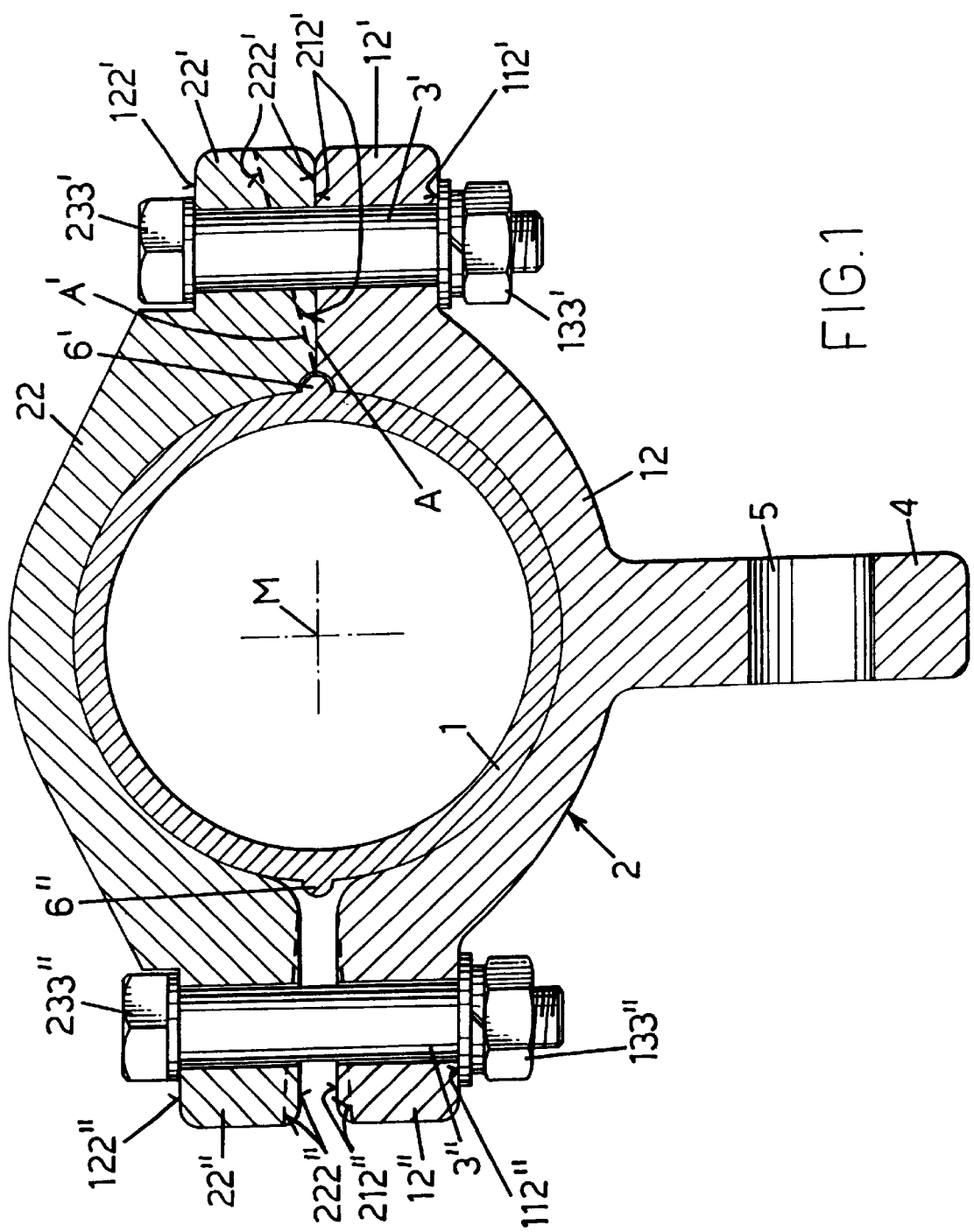
FIG. 1 shows a cross section of a first embodiment of the structure according to the invention, composed of a rod and of a collar locked thereon.

Referring to the drawing, the composite structure is, for example, a part of the comprehensive supporting framework of an overhead line for railway installations, or similar, and comprises a rod 1, with a circular outer profile, and preferably tubular and made of metal, for example aluminium, and a collar 2, made of two semicollars 12 and 22, preferably metallic themselves, for example made of aluminium. Each semicollar 12, 22 has two longitudinal lateral flanges 12', 12" and 22', 22" projecting outwards. Each flange 12', 12", 22', 22" is delimited by two plane-parallel surfaces 112', 212'; 122', 222'; 112", 212"; 122", 222". The facing surfaces 212', 222' and 212", 222" of the flanges 12', 22', and 12", 22" of the two semicollars 12 and 22 are next referred to, for reasons of simplicity, as "inner surfaces", while the opposite surfaces 112', 122' and 112", 122" are next referred to as "outer surfaces".

The inner surface of each semicollar 12, 22 corresponds to one sector of the outer surface of the rod 1 and extends over an angle of less than 180°, starting from the inner plane surface 212' or 222' of a flange 12', 22' of its respective semicollar 12 or 22 up to the inner plane surface 212" or 222" of the other flange 12", 22" of the same semicollar 12, 22. The inner plane surfaces 212', 222' of a first flange 12', 22' of each semicollar 12, 22 are touching. The inner plane surfaces 212", 222" of the opposite flange 12", 22" of the semicollars 12, 22 are parallel to each other and spaced to a certain extent. All is proportioned in such a way as to achieve the following method for assembly of the composite structure composed of the rod 1 and of the collar 2:

The two semicollars 12, 22 are mounted around the rod 1, by first making the inner surfaces 212' and 222' of the first flanges 12' and 22' of the said two semicollars 12 and 22 adhere and match. These first flanges 12' and 22' are compressed and locked, by tightening—eventually even definitively—the clamping bolt or bolts 3', passing through the flanges 12', 22' themselves. Further, the collar 2 is locked on the rod 1 by tightening also the opposite flanges 12" and 22" of the two semicollars 12 and 22 by means of their respective clamping bolts 3". All this may be carried out in such a way that, when these clamping bolts 3" are tightened thoroughly, that is when the right tightening value is reached, the collar 2 is firmly locked on the rod 1 and, at the same time, the facing inner surfaces 212", 222" of the flanges 12", 22" of the two semicollars 12 and 22 are substantially parallel, or the clamping bolt or bolts 3" may be tightened until the inner surfaces 212", 222" of the flanges 12", 22" of the two semicollars 12 and 22 take substantially parallel positions, which may be easily controlled by sight with sufficient accuracy, after which the collar 2 is firmly locked on the rod 1. The collar 2, firmly locked on the rod 1 takes the position shown in the drawing, in which the inner surfaces 212' and 222' adhere to each other. The facing inner surfaces 212" and 222" of the opposite flanges 12" and 22" of the two semicollars 12, 22 are spaced and substantially parallel, and their planes do not pass through the longitudinal central axis M of the rod 1. All outer surfaces 112', 112", 122', 122" of the four flanges 12', 12", 22', 22" of the two semicollars 12, 22 are at least substantially parallel to each other and all clamping bolts 3', 3" are orientated with their axes substantially perpendicular to the said surfaces, so as to substantially adhere with the whole of the bearing surface of their heads 233' and 233" and of their nuts 133', 133" or of their respective washers against the corresponding outer surfaces 112', 122', 112", 122" of their respective flanges 12', 22', 12", 22" of the semicollars 12 and 22.

The inner surfaces 212' and 222' of the two flanges 12, 22, which are touching in the working position, are parallel to each other and may be parallel to the corresponding outer surfaces 112' and 122' or slanted, giving the flanges a wedge shape, with conjugate and opposite slants.

This variant is illustrated in the figure by means of broken lines and the contact plane of the inner surfaces in referred to as A'.

The inner surfaces 212" and 222" of the flanges 12", 22" may be parallel or slanted with respect to the associated outer surfaces 112" and 122" and be parallel to each other or divergent as shown by means of broken lines or anyway they may have different slants in the working condition of the collar.

In order to simplify the above described mounting, the first flanges 12', 22' of the two semicollars 12, 22 may be marked or fabricated in any proper way, so that the operator may be informed that they are to adhere to each other and be tightened first.

In the illustrated embodiment, the collar 2 fixed on the rod 1 is intended to provide connection to other parts of a comprehensive structure, not shown, particularly to other parts of a supporting framework of an overhead line. For this purpose, the semicollar 12 is supplied, outwardly, for example substantially in the middle, with a connecting blade 4 with a substantially radial orientation and extending in the longitudinal direction of the rod 1, provided with a transverse hole 5 passing through it. In order to give the collar 2, on its mounting on the rod 1, a predetermined angular position, in which the connecting blade 4 is orientated in the right direction for connection with the associated part of the comprehensive structure, the rod 1 is provided, on its outer surface, in diametrically opposite positions, with two small positioning projections 6', 6", for example with a substantially semicircular profile, which may be made each of a longitudinal rib, extending over a limited portion of the length of the rod 1, or over the whole of the length of the rod 1 itself. In coincidence with the matching plane A of the inner surfaces 212', 222' of the first flanges 12', 22' of the two semicollars 12, 22, in the inner side of the collar 2, there is provided a positioning recess, for engagement of one of the outer positioning projections 6', 6" of the rod 1. This inner positioning recess of the collar 2 has a profile which is complementary to each outer positioning projection 6', 6" of the rod 1 and is made half in the semicollar 12 and half in the semicollar 22, accordingly profiling the angles between the inner arched surfaces of the semicollars 12, 22 and the inner matching arched surfaces 212', 222' of the first flanges 12', 22' of the semicollars 12, 22.

During the above described mounting of the collar 2 on the rod 1, previously turned in a proper manner about its longitudinal central axis M, the two semicollars 12, 22 are given such an angular position as to engage one of the outer positioning projections 6', 6" of the rod 1 in its respective inner positioning recess of the collar 2, provided as coinciding with the matching plane A between the first flanges 12', 22', thus automatically achieving the right orientation of the connecting blade 4. In the illustrated embodiment, the two outer positioning projections 6', 6" of the rod 1 are disposed on a substantially horizontal plane and the inner positioning recess, provided in coincidence with the matching plane A between the first flanges 12', 22' of the semicollars 12, 22, is engaged with the right outer positioning projection 6' of the rod 1, while the connecting blade 4 is orientated downwards. The other positioning projection 6" of the rod protrudes in the slot existing between the opposite spaced flanges 12", 22" of the semicollars 12, 22 and exerts no positioning action.

Instead of the outer positioning projections 6', 6", the rod 1 may have corresponding positioning recesses 6''', 6'''', for example formed by longitudinal grooves, while in the inner side of the collar 2, coinciding with the matching plane A between the first flanges 12', 22' of the two semicollars 12, 22, instead of the above described positioning recess, there will be provided an analogous positioning projection.

Figure 2:
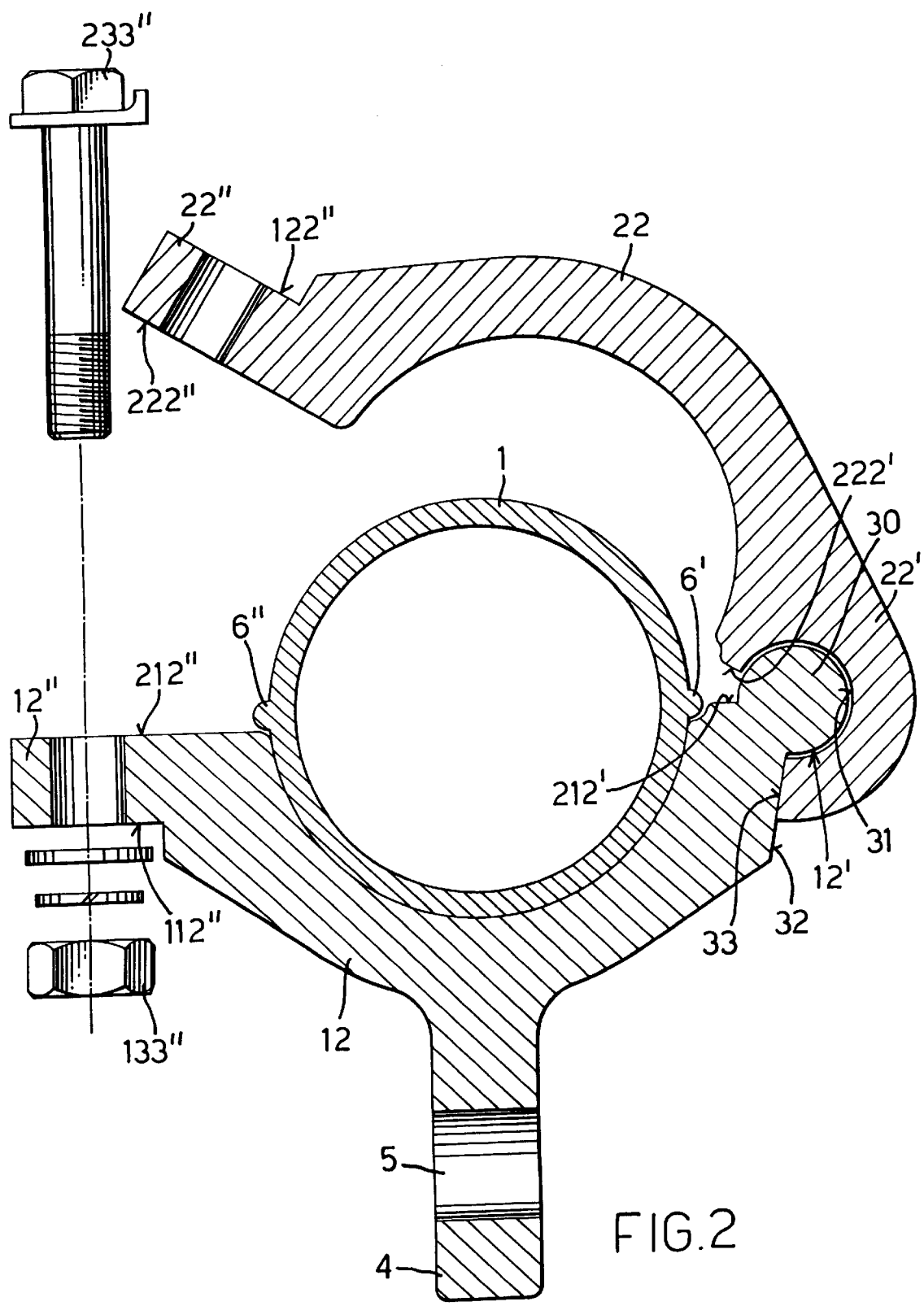
FIGS. 2 and 3 show a cross section of a second embodiment of the collar belonging to the structure of FIG. 1, respectively in a closed and in an opened condition.
Figure 3:
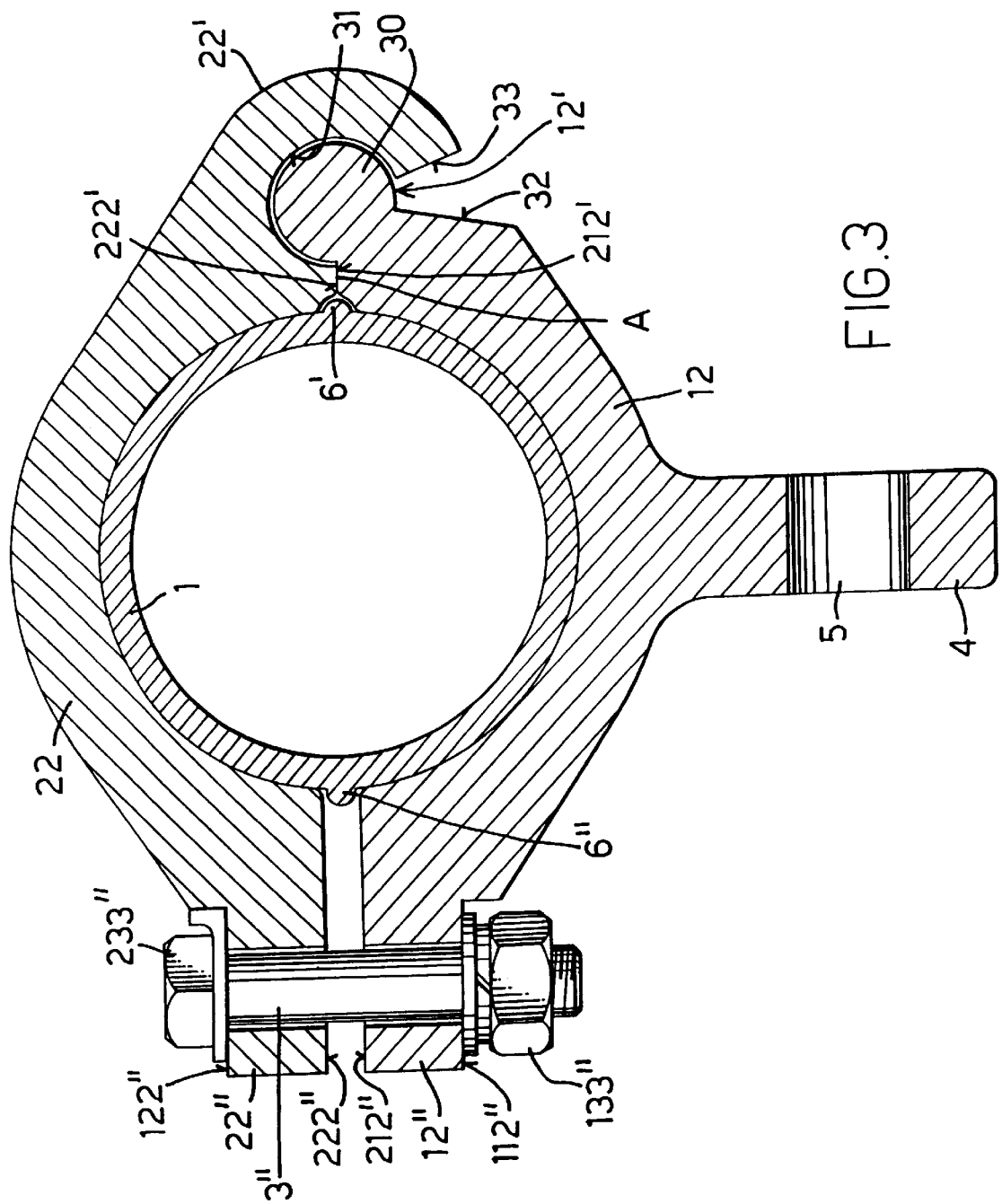
Figure 4:
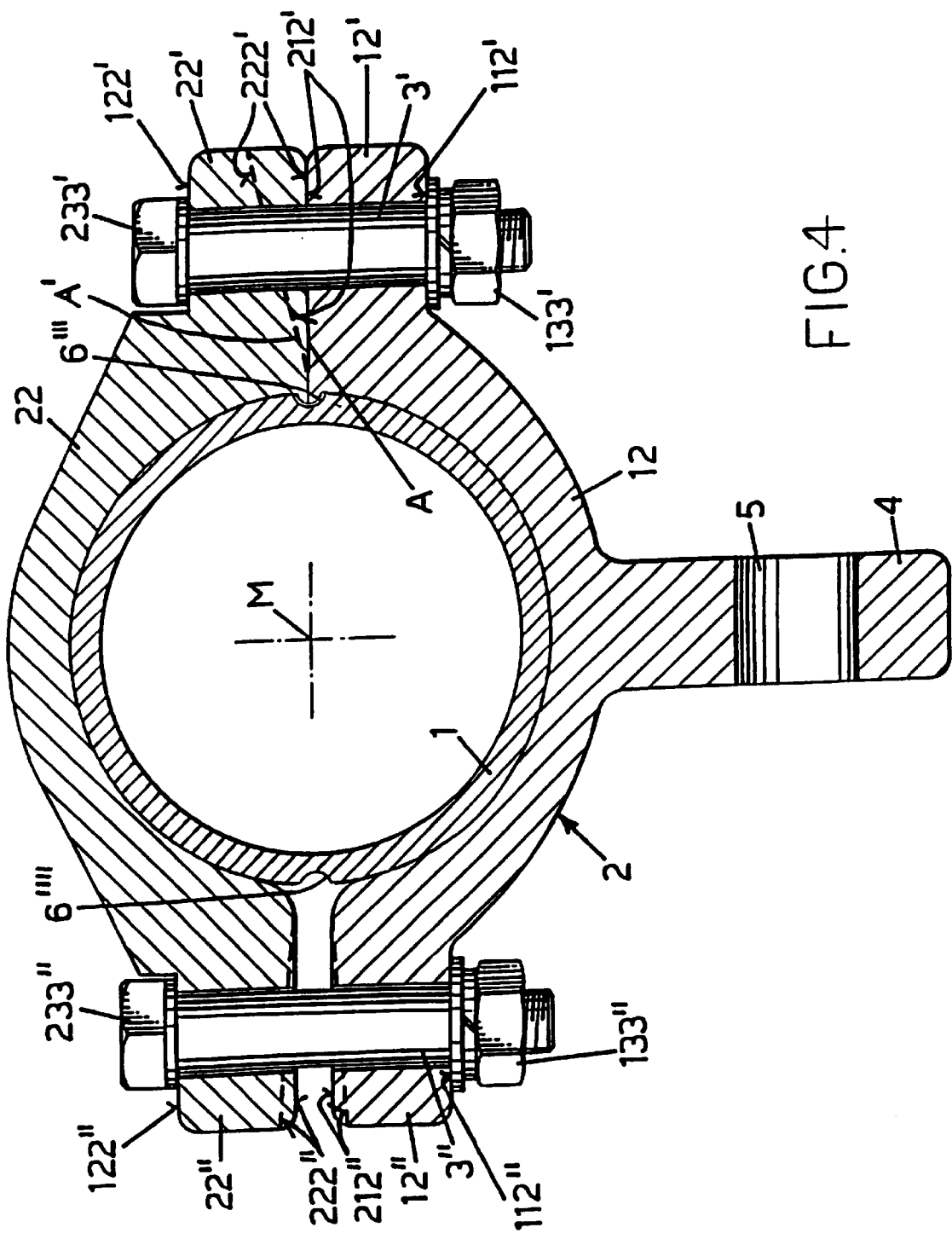
FIG. 4 shows a cross section of the first embodiment showing recesses in the rod and a projection of the collar.

FIGS. 2 and 3 show a second embodiment of the invention differing form the preceding one of FIG. 1 in the fact that the two semicollars 12, 22 are hinged one to the other at the associate first flanges 12', 22'. The inner touching surfaces 212', 222' are arranged in the radially most inner part of the flanges relatively to the hinging axis. The radially external ends of the flanges 12', 22' are shaped in the form of complementary part of a hinge. The flange 12 ends with a bolt element 30 connected in one piece to the flange itself and the bolt is arranged with a displacement corresponding to its radius towards the opposite flange and relatively to the associated touching surface 212" ina a way to form a cylindrical projection having an angular extension of 270°.

The flange 22' shows a projection which is arcuated in such a way to form a seat 31 for housing the hinging projection 30 of the opposite flange 12'. The seat has a cylindrical shape with its axis parallel to the axis of the collar and with an angular extension of more than 180°. The seat is opened at least at one of its heads and the two semicollars 12, 22 can be engaged together and disengaged one from the other by inserting and extracting the bolt 30 into and from the seat 31 with a displacement in a direction parallel to the axis of the collar.

As FIGS. 2 and 3 shows the flanges 12' and 22' forms also co-operating surfaces 32 and 33 limiting the angular width of the reciprocal angular displacement in direction of opening of the two semicollars thus defining a end position in direction of opening the collar.

As shown the collar according to FIGS. 2 and 3 may be provided with all or part of the features described in combination of the preceding embodiment according to FIG. 1.

Naturally, the invention is not limited to the embodiments described and illustrated herein, but may be greatly varied and modified, particularly as regards construction and covering all equivalents, without departure from the guiding principle disclosed above and claimed below.

I claim:

1. A composite structure comprising a rod (1) with a curvilinear and tubular profile and a collar (2) fixed on the rod (1), the collar composed of two semicollars (12, 22), each semicollar having first and opposite lateral longitudinal flanges (12', 12", and 22', 22") projecting outwards, the first flanges tightened and locked together by means of a clamping bolt (3') passing therethrough, each flange (12', 12", 22', 22") of each semicollar (12, 22) being delimited by an inner surface and an opposite outer surface which are substantially plane-parallel (112', 212'; 112", 212"; 122', 222'; 122", 222"), the inner surfaces of the flanges of one of the semicollars (212', 212"; 22', 22") facing the flanges of the other semicollar, a substantially semicylindrical inner surface of at least one of the semicollars (12, 22) extends over a circular arc between the inner surfaces (211, 212"; 2221, 222") of the flanges (12', 12"; 22', 22") of the at least one semicollar (12, 22), characterized in that the inner surfaces (212', 222') of the first flanges (12', 22') of each semicollar (12, 22) are on one common plane, whereas the inner surfaces (212", 222") of the opposite flanges (12", 22") of each semicollar (12, 22) are on substantially parallel planes and are spaced to such an extent that, when the collar (2) is mounted and locked on the rod (1), the first flanges (12', 22') of the two semicollars (12, 22) on one side of the collar adhere to each other at the inner surfaces thereof (212', 222'), whereas the opposite flanges (12", 22") of the two semicollars (12, 22) on the other side of the collar are spaced, and the inner surfaces (212", 222") of the opposite flanges are substantially parallel.

2. Structure as claimed in claim 1, characterized in that:
a) the two semicollars (12, 22) are mounted around the rod (1) through adhesion and matching of the inner surfaces (212', 222') of the first flanges (12', 22') and through tightening, the first flanges by means of the clamping bolt (3'),
b) further, the opposite flanges (12", 22") of the two semicollars (12, 22) are tightened by means of a second clamping bolt (3") until reaching the prescribed tightening value or the substantially parallel positions of the facing and spaced inner surfaces (212", 222") of the opposite flanges (12", 22").

3. Structure as claimed in claim 1, characterized in that the first flanges (12', 22') of the two semicollars (12, 22), which are meant to adhere to each other at the inner surfaces thereof (212', 222'), are marked or shaped as to be identifiable for the operator.

4. Structure as claimed in claim 1, in which at least one of the semicollars (12) has an outer connecting, means (4, 5) for connection to other associated parts, characterized in that the rod (1) has at least one outer positioning projection (6', 6"), suitable for engagement in a corresponding inner positioning recess of at least one of the semicollars (12, 22), thus defining a desired angular position of the collar (2) on the rod (1), particularly an angular position corresponding to a desired orientation of the outer connecting means (4, 5).

5. Structure as claimed in claim 4, characterized in that the rod (1) has at least two outer positioning projections (6', 6") which are angularly staggered and particularly, diametrically opposite.

6. Structure as claimed in claim 4, characterized in that the inner positioning recess of the collar (2) is provided at the inner surface of at least one of the semicollars (12, 22).

7. Structure as claimed in claim 4, characterized in that the inner positioning recess of the collar (2) is provided in coincidence with the common plane (A, A') of the first flanges (12', 22') of the two semicollars (12, 22).

8. Structure as claimed in claim 4, characterized in that the at least one outer positioning projection (6', 6") of the rod (1) is formed by a longitudinal rib extending on a portion of the length of the rod (1) or on the entire length of the rod itself, whereas the inner positioning recess of the collar (2) is formed by a groove extending the entire length of the collar (2).

9. Use of the composite structure as claimed in claim 1 in supporting frameworks of overhead lines for railway installations.

10. Structure as claimed in claim 1, wherein the inner surfaces of the first flanges are angularly disposed complementary to each other.

11. Structure as claimed in claim 1, wherein the inner surfaces of the opposite flanges are angularly disposed complementary to each other.

12. Structure as claimed in claim 1, in which at least one semicollar (12) has an outer connecting, means (4, 5) for connection to other associated parts, characterized in that the rod (1) has at least one outer positioning recess (6"", 6'"), suitable for engagement with a corresponding inner positioning projection of at least one of the semicollars (12, 22), thus defining a desired angular position of the collar (2) on the rod (1), particularly an angular position corresponding to a desired orientation of the outer connecting means (4, 5).

13. Structure as claimed in claim 12, characterized in that the rod (1) has at least two outer positioning recesses (6"", 6'") which are angularly staggered and particularly, diametrically opposite.

14. A method of using the collar of claim 1, comprising mounting the collar on the rod and positioning the collar at a desired position on the rod, closing the collar on the rod, touching the inner surfaces of the first flanges together, and tightening the bolt for moving the inner surfaces of the opposite flanges inward toward each other and spaced from each other.

15. A clamp collar for clamping a rod with a tubular profile comprising two semicollars having generally semicircular arcs of less than 180° and having lateral longitudinal flanges with distinctive inner surfaces on opposite sides of the collar, with the inner surfaces of first flanges on one side of the collar touching each other and opposite flanges on a second side of the collar spaced from each other when the collar is mounted and locked on the rod, a connector holding the first flanges together with inner surfaces touching each other and a bolt extending through the opposite flanges and holding the opposite flanges inward toward each other, wherein the connector comprises a bolt and nut.

* * * * *